United States Patent [19]
Brown et al.

[11] Patent Number: 5,172,800
[45] Date of Patent: Dec. 22, 1992

[54] CONVEYING APPARATUS

[76] Inventors: Peter A. Brown, 7 Greenacres, Werrington, Peterborough PE4 6LH; Peter J. Smith, 42 Pinewood Close, Bourne, Lincolnshire, PE10 9RL, both of England

[21] Appl. No.: 704,349

[22] Filed: May 23, 1991

[30] Foreign Application Priority Data

May 25, 1990 [GB] United Kingdom ............... 9011751

[51] Int. Cl.$^5$ ............................................. B65G 47/24
[52] U.S. Cl. ...................................... 198/380; 198/415
[58] Field of Search ......................... 198/380, 415, 493

[56] References Cited

U.S. PATENT DOCUMENTS

| | | | |
|---|---|---|---|
| 3,462,001 | 8/1969 | Boyce | 198/415 |
| 3,809,214 | 5/1974 | Reist | 198/415 X |
| 3,954,171 | 5/1976 | Chick et al. | 198/380 |
| 4,135,616 | 1/1979 | Pellaton | 198/380 X |
| 4,720,006 | 1/1988 | Lenherr | 198/415 |

FOREIGN PATENT DOCUMENTS

| | | | |
|---|---|---|---|
| 3730307 | 3/1989 | Fed. Rep. of Germany | 198/380 |
| 0089125 | 7/1980 | Japan | 198/380 |
| 0156364 | 4/1978 | Netherlands | 198/493 |

Primary Examiner—Robert P. Olszewski
Assistant Examiner—James R. Bidwell
Attorney, Agent, or Firm—Plante, Strauss and Vanderburgh

[57] ABSTRACT

High speed turning of elongate confectionery bars through 90° is executed in two stages. The bars are turned through an acute angle in a first stage by a timed blast of air from an air jet while the bar are in flight between first and second conveyors and through a further acute angle by a pair of diverging differential speed conveyors. The timing of the air blast is achieved by detecting the leading edge of the bar by sensors prior to projection. The orientation of the bar is checked by further sensors after initial transfer to the differential speed conveyors, and the relative speeds of those conveyors is adjusted if necessary to complete the turn.

10 Claims, 3 Drawing Sheets

CONVEYING APPARATUS

This invention relates to conveying apparatus and particularly to conveying apparatus for turning an elongate object.

The invention relates particularly, but not exclusively, to the turning of relatively fragile objects, such as confectionery bars, travelling at high speeds.

The invention stems from some work to solve a problem in the high speed handling of fragile confectionery bars such as chocolate-enrobed bars of oblong shape. Such bars issue from a wrapping machine with their axes aligned with the longitudinal direction of the wrapping machine out-feed conveyor. In order to collect the bars into groups for wrapping as a group by a second wrapping machine, it is necessary to turn all of the bars through 90°. There are various mechanical arrangements known for achieving a 90° turn but these are either limited in speed or are likely to cause some damage to the bar.

For example, the in-feed conveyor to the second wrapping machine can be arranged at 90° to the out-feed conveyor of the first wrapping machine, and a synchronised pusher is used to transfer bars from the one conveyor to the other, the turn being achieved by changing the feed direction of the bars. In addition to the problem of product damage by the mechanical pusher, especially at high speeds such as 1,000 units per minute, which modern wrapping machines can achieve, such conveyor systems occupy a large factory floor area.

Whilst in-line transfer systems between wrapping machines are known, these employ a system of pushers or cams, with out-feed from the first wrapping machine needing to be position-controlled by chain lugs or similar, and feeding also into chain lugs at the in-feed to the second wrapping machine.

We have devised a conveyor assembly in which a timed air blast is employed to turn a bar in flight between two conveyors by an initial amount, and then the full turn to 90° is completed by a pair of conveyor bands running at differential speeds.

Specification No. GB 2,189,453A discloses a transfer arrangement for transferring articles supported in a single line on one moving conveyor belt to another moving conveyor belt or belts so that the articles move in a plurality of lines thereon, said another conveyor belt being disposed immediately below said one conveyor belt and the two belts diverging in the direction of travel at an angle of up to 45°, the transfer arrangement comprising a plurality of transfer units equal in number to the desired number of lines of articles, said transfer units being disposed in spaced side by side relationship alongside the one conveyor belt, each transfer unit comprising means for directing a controlled jet of air at an article on the one conveyor belt to cause a controlled lateral displacement of the article and a controlled angular movement of the article so that it is deposited on said another conveyor belt at the required position and orientation, an article sensing means disposed upstream of said transfer units for sensing the passage of articles on the one conveyor belt and control means responsive to signals provided by said sensing means for activating said transfer units.

According to one aspect of the present invention a conveying apparatus for turning an elongate object comprises first and second substantially aligned belt conveyors, the first conveyor being arranged to project objects onto the second conveyor, and gas blast means so arranged as to direct a blast of gas at an object whilst the object is in flight between the two conveyors, the direction of the gas blast being substantially parallel to the conveying surfaces of the conveyors such that an object is turned by the blast about an axis which is substantially normal to the conveying surfaces of the conveyors.

The out-feed end of the first conveyor is preferably higher than the in-feed end of the second conveyor such that the objects fall slightly in passing between the conveyors.

Whilst it is known to use an air blast to turn objects whilst they are being carried by a belt conveyor, the inventive conveying apparatus has the advantage that the bars whilst in flight turn precisely about their centres of gravity, whereas when bars are turned at least partially on the conveyor belt by air the friction forces between the bars and the belt can be uneven and lead to variable turning.

In order that the air blast provides a turning moment of a closely controlled amount, timing means is preferably provided to track the forward movement of the object and to control the timing of a blast on either the forward portion of the object or on the rearward portion.

Specifications No. GB 1,093,126 and 1,093,127 proposed apparatus for forming an overlapped formation of biscuits on a conveyor in which the trailing ends of the biscuits are depressed towards the conveyor as they fall from a supply conveyor, but this involved no turning in the plane of the conveyor surface.

The angle through which the objects are turned by the apparatus in accordance with the first aspect of the present invention is preferably less than 45° and is most preferably less than 35°.

The timing means preferably comprises an object sensor positioned in advance of the gas blast means but closely adjacent thereto.

Conveniently the object sensor is a photoelectric means arranged to direct a beam through a gap between the out-feed end of the first conveyor and the in-feed end of the second conveyor. The speed of forward movement of the object on leaving the first conveyor can be determined from a shaft encoder associated with the conveyor drive to the first conveyor.

According to a second aspect of the invention, a method of turning an elongate object comprises projecting the object from one end of a first belt conveyor onto a substantially in-line, second belt conveyor, and directing a timed gas blast at the object whilst the object is in flight, the gas blast being directed substantially parallel to the upper surfaces of the conveyors.

A third aspect of the invention is concerned with turning a confectionery bar whilst the bar is supported on a pair of conveyor bands having differential speeds.

It has been proposed in U.S. Pat. No. 4,720,006 to turn an elongate object by supporting the object on a pair of parallel belt conveyors driven at different speeds. The apparatus described is for turning confectionery bars which initially extend transversely of an in-feed conveyor into a longitudinal orientation for feeding to a wrapping machine. The differential speed belts initiate the turn which is then completed by a diverter belt positioned above an out-feed conveyor. In an attempt to define the turning axis of the bars, the upper surfaces of the differential speed belts are inclined to each other such that the ends only of the bars are contacted by the bars. The belt speeds, although manually adjustable, are not adjusted for individual bars.

We are aware that differential speed conveyors have been proposed in specification no. GB 2,186,252A for the controlled turning of stacks of paper sheets, presumably at relatively low speeds as compared with those attained by confectionery bars.

According to the third aspect of the present invention a conveying apparatus for turning a confectionery bar comprises a pair of side-by-side differential speed belt conveyors (the belt may be a cord as hereinafter discussed), means for measuring the orientation of a bar at or adjacent to the in-feed end of the differential speed conveyors, and control means responsive to the measuring means for controlling the speed differential between the differential speed conveyors so as to produce a predetermined orientation of the bar at the out-feed end of the conveyor.

Thus, the initial orientation of each bar can be measured and the differential speed adjusted as necessary to achieve a desired orientation where the bar passes to the succeeding apparatus. Of course, when the apparatus is to be operated at high speed suitable motors having a fast response time to speed control signals are required.

Preferably the speed of only one of the differential speed belts is varied. The speed of the other differential speed belt is preferably synchronised with the speed of a supply conveyor which feeds the bars onto the differential speed conveyors.

The conveyors are preferably cord conveyors.

The use of cord conveyors has the advantage that the lines of contact of the conveyors with the object being conveyed are relatively precisely determined, and therefore the accuracy of turning can be better than for conventional belt conveyors.

According to a fourth aspect of the invention, a conveying apparatus for turning a confectionery bar comprises a pair of side-by-side differential speed conveyors, the conveyor paths diverging from each other in the conveying direction.

The divergence of the conveyors helps to control the turning of a bar which is being turned from an orientation at the in-feed end which is more acute to the feed direction than the orientation of the bar at the out-feed end. This is particularly applicable for high-speed feeding.

As previously mentioned, an advantageous embodiment of the invention employs a conveying assembly in accordance with the first aspect of the invention arranged to feed a further conveying apparatus in accordance with the third and/or fourth aspects of the invention. The assembly in accordance with the first aspect can be used to carry out an initial turning of the object such that the object is fed to the further conveying apparatus in an orientation which enables the object to be accepted by the further apparatus which then provides a further turning.

Such a combination of conveying apparatus is particularly suitable for accepting confectionery bars with their axes aligned substantially with the longitudinal axis of the first conveyor, and to turn the bars through 90° such that they are then fed to further apparatus in a transverse orientation.

Such a combination is particularly suitable for accepting individually-wrapped confectionery bars from a wrapping machine, which machines normally operate with the bars extending longitudinally of the feed direction, and to supply the turned bars to a further wrapping machine where groups of the bars are wrapped in a further wrapper.

A conveying apparatus for confectionery bars and in accordance with the various aspects of the invention will now be described, by way of example only, with reference to the accompanying drawings in which.

Figure 1:
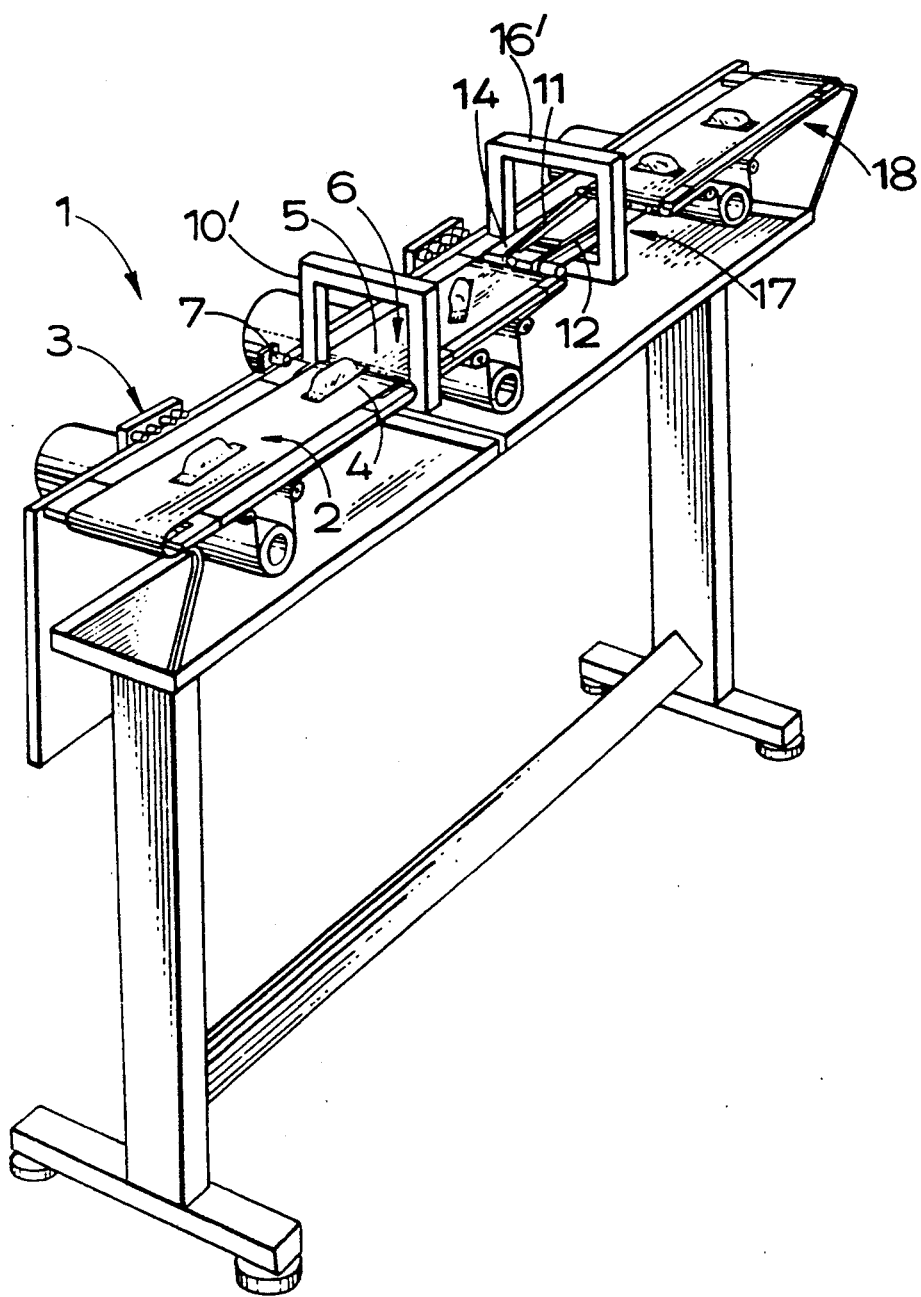
FIG. 1 is a schematic perspective view of the conveyor assemblies.
Figure 2:
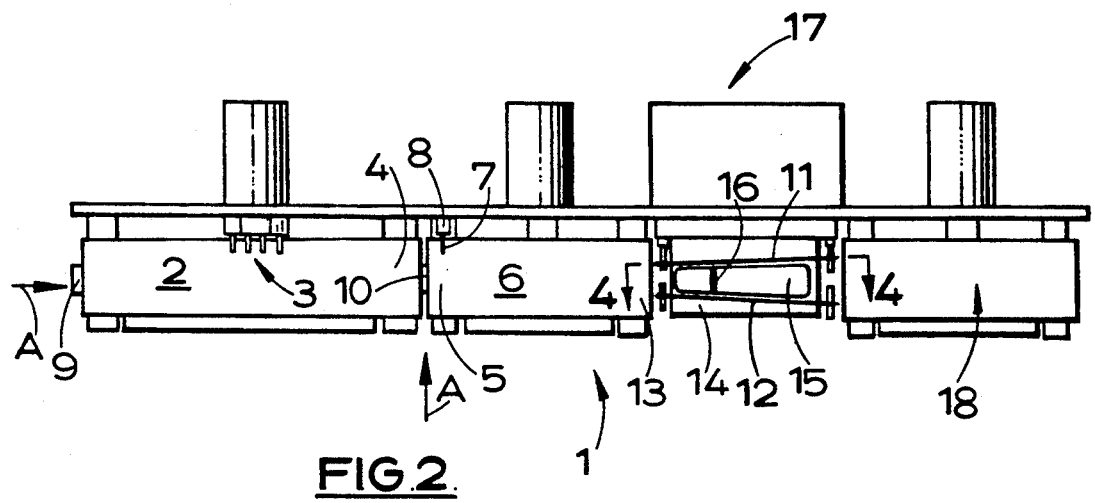
FIG. 2 is a plan view of the conveyor assemblies.
Figures 3, 4:
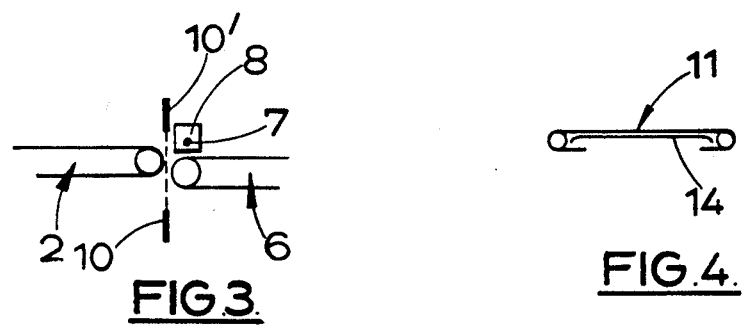
FIG. 3 is a partial side view looking in the direction of arrow A in FIG. 2.
FIG. 4 is a scrap section on the line 4—4 of FIG. 2.
Figure 5:
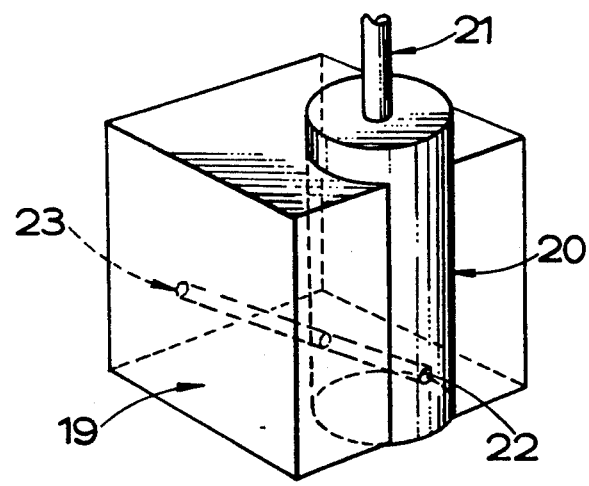
Figure 6:
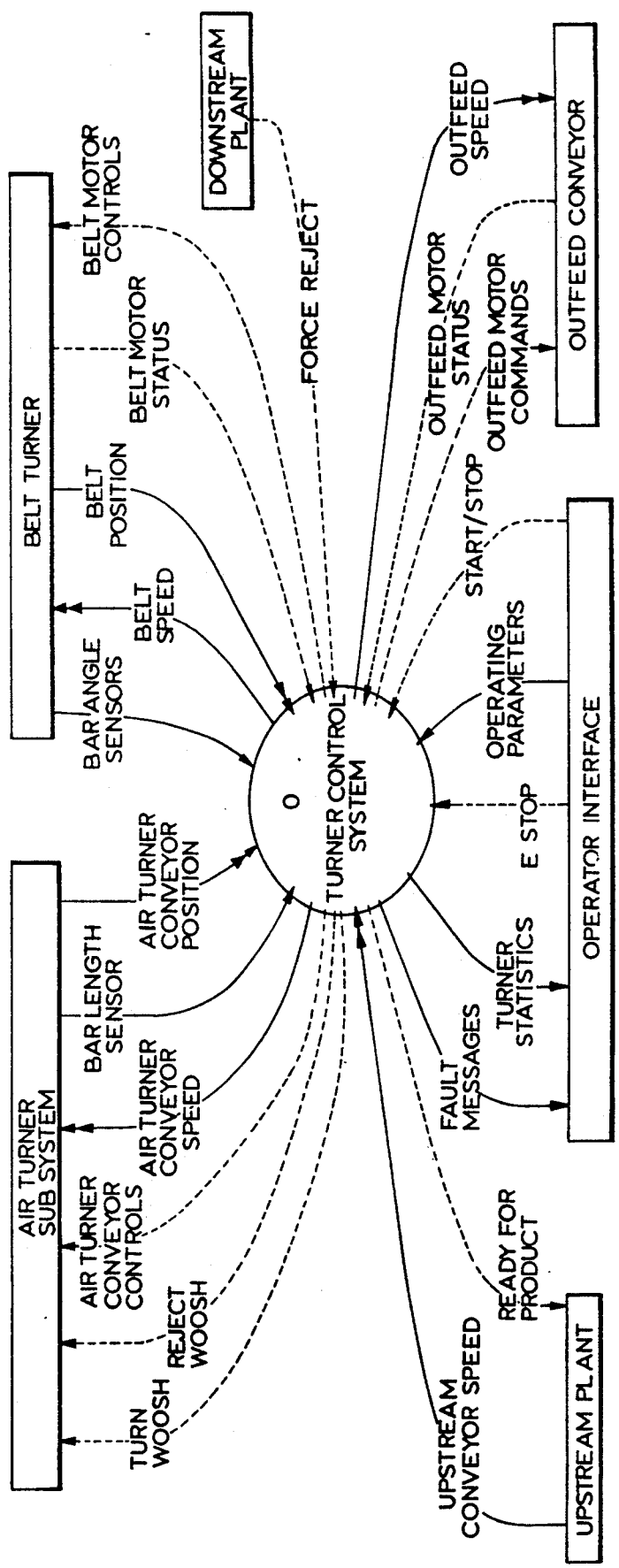

FIG. 5 is a partially cut-away schematic perspective view of a high speed rotary valve controlling the air supply to the air jet, and FIG. 6 is an organisational chart of the control system for the conveyor assemblies of FIG. 1, With reference to FIGS. 1 and 2 there is shown a compact in-line turning unit 1 for positioning between a wrapping machine for individual, elongate confectionery bars b and a further wrapping machine arranged to group together a plurality of the wrapped bars and to wrap the group in an overall wrapping. The wrapping machine for individual bars has an out-feed conveyor, not shown, which conveys the bars with their longitudinal axes on the longitudinal axis of the out-feed conveyor. The wrapping machine out-feed conveyor feeds the first horizontal belt conveyor 2, as indicated by arrow A in FIG. 2, with the spaced-apart wrapped bars, and these are projected by the out-feed end 4 of the conveyor 2 onto the in-feed end 5 of a second horizontal belt conveyor 6 which is arranged with its upper surface a few mm below the level of the upper surface of the first conveyor 2, as shown in FIG. 3. Whilst the bars are in flight between leaving the conveyor 2 and landing on conveyor 6 they are each subjected to a controlled blast of air by an air jet 7 positioned above the in-feed end of second conveyor 6, the air jet 7 being controlled by a solenoid-operated valve 8.

The air jet 7 is directed substantially horizontally and transversely of the second conveyor 6 and the air blast is timed such that it strikes only the leading or trailing half of the bar whilst the bar is in flight, depending on the required direction of turn. The timing signal for the air blast is obtained from photo-sensor arrays 9, 10 and from a shaft encoder associated with the drive to first conveyor 2. It will be appreciated that the shaft encoder signals will be a measure of the speed of the bar when it is projected onto the second conveyor 6, and that the array 10 will provide a time reference. The multiple signals produced by the various sensors of array 10 are used to provide immunity against false triggering of air jet 7. The light sources for the array 10 are carred by a yoke 10[1].

The generally horizontal direction of the air jet 7 is such as to cause a bar in flight to be pivoted about a vertical axis through its centre of gravity. This provides a precise degree of turning when the bars are fed substantially to the centre-line of the conveyor 2.

The sensor array 9 is used to monitor the lengths of the wrapped bars coming from the wrapping machine, and any out-of-specification bars are arranged to be diverted from conveyor 2 by applying air to a bank of air jets 3. Also, if a downstream problem is detected, the air jets 3 can again be operated to arrest the flow of bars.

The air jet 7 is arranged to turn the bars by about 30° from the longitudinal axis of the conveyor 6, but angles of up to about 45° would be possible. The bars then proceed along conveyor 6 at this angle, as shown in FIG. 1.

The speed of the first conveyor 2 can be adjusted to alter the spacing of the bars if desired.

The operation of the air turner is subject to automatic long-term correction by the control system based on measurements of the achieved turn by a further sensor array, not shown, on conveyor 18.

FIG. 5 shows schematically a suitable rotary valve assembly for providing the burst of compressed air to air jet 7. The valve assembly comprises an aluminium valve block 19, the front right hand side having been cut away in FIG. 5, formed with a cylindrical bore in which a cylindrical aluminium valve rotor 20 of low inertia is freely rotatable. The rotor 20 is of 15 mm diameter, and a substantial radial clearance of about 0.1 mm is provided between rotor 20 and block 19 to avoid rubbing contact, permanent leakage of air through this clearance providing an air-cushion to facilitate rapid response of the rotor to turning forces applied by a high speed drive motor, not shown, coupled to rotor shaft 21. The drive motor is capable of rapidly turning the valve rotor 20 from the on position shown in FIG. 5, in which a transverse bore 22 in the rotor is aligned with an air supply bore 23 and an air delivery bore, not shown, in block 19, through an angle of about 10° to an off-position. The air delivery bore is connected directly to air jet 7.

A pair of horizontal diverging cord conveyors 11, 12, the differential speed conveyors, have their upper cord runs level with the upper surface of the belt of second conveyor 6 and extending from closely adjacent the out-feed end 13 of second conveyor 6. The upper runs of cords of conveyors 11, 12 are supported on a horizontal support plate 14 having a central elongate aperture 15, beneath which is located a photoelectric sensor array 16.

The cords of the differential speed conveyors 11, 12 are independently-driven such that a speed differential can be given to the cords. The cord 11 is driven by the drive to second conveyor 6 such that it is in synchronism therewith, to receive the leading end of the spaced-apart angled bars coming from second conveyor 6, to facilitate a smooth transfer of the angled bars onto the differential speed conveyor assembly 17 comprised by conveyors 11, 12. At transfer the conveyor 12 is running at a nominal speed faster than that of conveyor 11 by about 20%.

The speed of the conveyor 12 is controlled such that the individual bar being conveyed along assembly 17 is turned to a 90° position with respect to the longitudinal axis of assembly 17 by the time that the bar reaches the out-feed end of assembly 17, where it is transferred to a transfer belt conveyor 18.

A fast-response motor is used to drive the cord of conveyor 12, and the instantaneous speed of the cord is precisely controlled to achieve the required transverse orientation of the bar.

The sensor array 16 comprises a line of photoelectric sensors extending transversely of the assembly 17 and is used to measure precisely the actual angular orientation of the bar as it passes over the sensor 16, light emitters for the array 16 being mounted on a vertically aligned yoke 16[1]. The amount of corrective turning that is required to bring the bar to a transverse position is then computed, and a speed profile for the conveyor 12 is then computed and applied to the drive to conveyor 12.

Since the sensor array 16 is positioned after the transfer from conveyor 6 to the conveyors 11, 12 has been completed, an accurate assessment of the turned condition and the need for further turning is made.

The length of the conveyors 11, 12 will usually be such that they will hold more than one bar. The control system tracks the bars as they progress along the conveyors 11, 12 using encoders fitted to the drive motors, and applies corrections as required to the leading bar. As that bar transfers to conveyor 18 the next bar on the belts is examined and action is commenced to achieve the desired angle of turn.

The degree of correction that can be applied to a bar will be limited by the maximum acceleration that is possible before the bar rolls or slips on the correcting cord. In addition a correction that would cause the succeeding bar to be badly misplaced is also prevented by the control system from being applied.

Thus, the assembly 17 is capable of handling bars fed to it which may vary slightly in angular orientation, the speed of conveyor 12 being altered accordingly to compensate.

A microprocessor control system is employed to control the various functions and the functional layout of the control system is shown in FIG. 6.

The transverse spacing of the cords of the differential speed conveyors 11, 12 at the in-feed end is sufficient to ensure that both ends of the angled bars fed by second conveyor 6 are supported by the cords. The cords diverge at approximately the same rate as the ends of the bar move transversely of the conveyor assembly 17 as the bar is turned to a fully transverse orientation, this arrangement minimising any transverse movement of each bar end relative to the respective cord. This diverging of the conveyors 11, 12 helps to provide accurate transverse positioning of the bars fed to transfer conveyor 18, and thereby avoids the need for any mechanical pusher to position the bars transversely, which might otherwise damage the bars.

The cords of conveyors 11, 12 are typically of diameter 3 mm, and the resulting local contact with the bars leads to precise control over the turning of the bars.

It will be appreciated that an initial turning of approximately 30° is performed by conveyor assemblies 2, 6 and that a final turning of approximately 60° is performed by the assembly 17.

The transfer conveyor 18 is provided for matching the speed of the bars to the speed of the succeeding in-feed conveyor, not shown, of the further wrapping machine which collects and wraps together a group of the bars. A suitable arrangement for controlling the operation of the transfer conveyor 18 is described in specification no. GB 2,187,697A. The further sensor array, not shown, on conveyor 18 provides a final check of the achieved overall angle of turn for statistical purposes.

It will be appreciated that the apparatus shown is very compact, about 2 m long, as compared with known turning assemblies. This is partly due to the in-line arrangement of the conveyors and partly due to the compactness of the individual turning units results from the turning techniques employed.

The apparatus shown can handle bars of the following dimensions; width: 10–100 mm, height: 5–50 mm, length: 40–200 mm, contained in a FLOWPAK (TM).

Thus, bars of high length to width ratios of 20:1 can be orientated at high speeds from a narrow edge leading configuration.

The use of microprocessor control enables the incorporation of the self-clearing features discussed for faulty bars, and so these bars will not be passed to the further wrapping machine where they would cause jams and stoppages.

Microprocessor control also enables the turning characteristics of different types of bars to be memorised so that a production change from one type of bar to another can be accomplished rapidly simply by informing the control system of the type of bar that is next to be processed. The sensor array 10 can be used to identify the kind of bar being fed and the control system can arrange for an appropriate air blast to be applied to the bar.

We claim:

1. A conveying apparatus for turning an elongate object about a vertical axis comprising first and second substantially aligned belt conveyors presenting substantially horizontal conveying surfaces on which said object is conveyed, an outfeed end of said first conveyor being arranged to project an object in a generally horizontal direction onto said second conveyor, and gas blast means so arranged as to direct a blast of gas at an object whilst the object is in flight between said first and second conveyors, the direction of the gas blast being substantially horizontal whereby said object is turned by the blast about a substantially vertical axis whilst said object is in flight between said first and second conveyors.

2. A conveying apparatus as claimed in claim 1 in which said outfeed end of the first conveyor is higher than an in-feed end of the second conveyor such that the objects fall slightly in passing between the conveyors.

3. A conveying apparatus as claimed in claim 1 comprising timing means so arranged as to track the forward movement of the object and to control the timing of said blast on one end portion of the object.

4. A conveying apparatus for turning an elongate object comprising first and second substantially aligned belt conveyors presenting conveying surfaces on which said object is conveyed, said first conveyor being arranged to project objects onto said second conveyor, gas blast means so arranged as to direct a blast of gas at an object whilst the object is in flight between said first and second conveyors, the direction of the gas blast being substantially parallel to said conveying surfaces whereby said object is turned by the blast about an axis which is substantially normal to said conveying surfaces, timing means so arranged as to track the forward movement of the object and to control the timing of said blast on one end portion of the object, and wherein said gas blast means comprises a gas jet supplied with gas by a rotary valve, said rotary valve comprising a valve rotor which is turnable with substantial radial clearance in a bore in a valve block, whereby a gas cushion is produced in sue between said rotor and said block to reduce resistance to turning of said rotor.

5. A conveying apparatus for turning an elongate object comprising first and second substantially aligned belt conveyors presenting conveying surfaces on which said object is conveyed, said first conveyor being arranged to project objects onto said second conveyor, gas blast means so arranged as to direct a blast of gas at an object whilst the object is in flight between said first nd second conveyors, the direction of the gas blast being substantially parallel to said conveying surfaces whereby said object is turned by the blast about an axis which is substantially normal to said conveying surfaces, a pair of side-by-side differential speed belt conveyors arranged to receive the objects from the second conveyor, means for measuring the orientation of an object at or adjacent to an in-feed end of the differential speed conveyors, and control means responsive to the measuring means for controlling the speed differential between the differential speed conveyors so as to produce a predetermined orientation of the object at the out-feed end of the differential speed conveyors.

6. A conveying apparatus as claimed in claim 5 in which the speed of only one of the differential speed belts is varied, and the speed of the other differential speed belt is synchronised with the speed of the second conveyor.

7. A conveying apparatus as claimed in claim 5 in which the differential speed belts are cords.

8. A conveying apparatus as claimed in claim 5 in which the conveyor paths of the differential speed belts diverge from each other in the conveying direction.

9. A method of turning an elongate object comprising projecting the object from one end of a first belt conveyor onto a substantially in-line, second belt conveyor, and directing a timed gas blast at the object whilst the object is in flight between said first and second conveyors, the gas blast being directed substantially parallel to the upper surfaces of the conveyors such that the object is turned through an acute angle by the gas blast, the object then being turned through a further acute angle by a pair of differential speed conveyors, whereby the object lies substantially transversely of the longitudinal axis of the differential speed conveyors at the out-feed end thereof.

10. A method of turning an elongate object about a vertical axis comprising projecting said object in a generally horizontal direction from an outfeed ned of the upper surface of a first belt conveyor onto the upper surface of a second belt conveyor, the direction of movement of said upper surfaces being in substantially the same vertical plane, and directing a timed gas blast at the object whilst the object is in flight between said first and second conveyors, the gas blast being directed substantially horizontally, whereby said object is turned in flight about a vertical axis by said gas blast to land on said upper surface of said second conveyor, whereby the angle between the longitudinal axis of said object and said vertical plane when said object comes to rest on said upper surface of said second conveyor is different from the corresponding angel between the longitudinal axis of said object and said vertical plane when said object is supported on said first conveyor prior to projection therefrom.

* * * * *

UNITED STATES PATENT AND TRADEMARK OFFICE
CERTIFICATE OF CORRECTION

PATENT NO. : 5,172,800
DATED : December 22, 1992
INVENTOR(S) : Peter A. Brown, Peter J. SMith, et al It is certified that error appears in the above-identified patent and that said Letters Patent is hereby corrected as shown below:

Col 7, Line 57 delete "sue" and replace with --use--

Col.8. Line 5 delete "nd" and replace with --and--

Col.8. Line 57 delete "angel" and replace with --angle--

Signed and Sealed this

Nineteenth Day of October, 1993

*Attest:*

BRUCE LEHMAN

*Attesting Officer*  *Commissioner of Patents and Trademarks*